(12) United States Patent
Kim et al.

(10) Patent No.: US 6,567,432 B1
(45) Date of Patent: May 20, 2003

(54) WIDEBAND MULTICHANNEL FIBER LASERS WITH OUTPUT POWER EQUALIZATION

(75) Inventors: Seung Kwan Kim, Taejon (KR); Dong Ho Lee, Taejon (KR); Jae Geun Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/482,351

(22) Filed: Jan. 14, 2000

(30) Foreign Application Priority Data

Dec. 9, 1999 (KR) .............................. 99-56220

(51) Int. Cl.[7] .............................. H01S 3/30; H01S 3/10; H01S 3/13; H01S 3/091; G02B 6/28

(52) U.S. Cl. .............................. 372/6; 372/20; 372/32; 372/70; 385/24

(58) Field of Search .............................. 372/6, 20, 70

(56) References Cited

U.S. PATENT DOCUMENTS

| 4,813,756 A | * | 3/1989 | Frenkel | 350/96.18 |
|---|---|---|---|---|
| 5,125,743 A | * | 6/1992 | Rust | 356/367 |
| 5,189,676 A | * | 2/1993 | Wysocki | 372/6 |
| 5,524,118 A | | 6/1996 | Kim et al. | 372/6 |
| 5,808,787 A | * | 9/1998 | Meli | 359/341 |
| 6,097,741 A | * | 8/2000 | Lin | 372/6 |
| 6,229,939 B1 | * | 5/2001 | Komine | 385/29 |
| 6,243,168 B1 | * | 6/2001 | Heflinger | 356/486 |
| 6,333,941 B1 | * | 12/2002 | Hung | 372/20 |

* cited by examiner

*Primary Examiner*—Quyen Leung
*Assistant Examiner*—Armando Rodriguez
(74) *Attorney, Agent, or Firm*—Jacobson Holman PLLC

(57) ABSTRACT

A multichannel fiber laser whose wavelength range is expansible to increase the number of lasing channel, and whose channel output powers are equalized, in order to provide a useful multichannel laser source having a wide bandwidth is described. The laser comprises a gain offering means; a gain equalizing means; and a resonating means. In addition, a method for designing the spectral profile of a gain equalizing filter for the purpose of this invention is described.

16 Claims, 7 Drawing Sheets

WIDEBAND MULTICHANNEL FIBER LASERS WITH OUTPUT POWER EQUALIZATION

BACKGROUND OF THE INVENTION

The present invention relates to a wideband multichannel fiber laser used in WDM (Wavelength Division Multiplexing) optical communication systems, more particularly, to a wideband multichannel fiber laser whose wavelength range is expansible to increase the number of lasing channel, and whose channel output powers are equalized, in order to provide a useful multichannel laser source having a wide bandwidth.

A multichannel fiber laser is an apparatus for simultaneously outputting multiple laser lights having different wavelengths with uniform wavelength interval from one fiber laser apparatus. Such a fiber laser can be used as a light source for signal transmission in a WDM optical communication system and for characterization and evaluation of WDM devises and apparatuses.

A laser is composed of a gain medium, a pumping light source and a resonator, alternatively called a laser cavity. Among various materials that can be used as a gain medium of a fiber laser, an erbium-doped fiber (EDF) is most widely used. The EDF has also been used to make an optical fiber amplifier in an optical fiber communication system, known as an erbium-doped fiber amplifier (EDFA). A semiconductor laser, that is commonly known as a laser diode, having a wavelength of 980 nm or 1480 nm is used as a pumping light source and a WDM coupler is used to launch the pumping light into the EDF. A conventional directional coupler is used as an output coupler that extracts the laser output from a laser cavity. All the components including the WDM coupler, the EDF and the directional coupler are fusion-spliced or connected to form a laser cavity.

In EDF, small signal gain is established in proportion to launched pump power. When the small signal gain becomes equal to cavity loss, laser oscillation takes place at the wavelength of peak gain in spectral domain. Once the laser oscillation takes place, the laser output power is determined so that the saturated gain of the EDF may be equal to cavity loss. Consequently, the small signal gain at the lasing threshold is always the same as the saturated gain above the lasing threshold.

An optical filter is required when the laser oscillation at a specific wavelength is desired out of the wide gain bandwidth of EDF. If the optical filter passes-a single wavelength only, it is called a single channel filter and the laser containing this filter oscillates in a single wavelength or a single channel. If the optical filter passes multiple wavelengths, it is called a multichannel filter and the laser containing this filter may oscillate in multiple wavelengths or multiple channels. However, since the gain spectrum of EDF is dominated by homogeneous line broadening at room temperature, an erbium-doped fiber laser (EDFL) tends to oscillate in a single channel even though the multichannel filter is used. Particularly, if an optical isolator is inserted in a ring cavity to enable unidirectional laser operation, spatial hole burning effect does not appear in the gain medium, so that the laser is highly favorable to single longitudinal mode oscillation. Therefore, suppressing the tendency toward single mode oscillation is a crucial technology to obtain multichannel laser oscillation from EDFL s.

Gain bandwidth of EDF reaches ~80 nm in 1550 nm wavelength range. If multichannel laser oscillation could be obtained with 100 GHz WDM channel spacing defined by ITU(International Telecommunications Union) from an EDFL, the maximum number of channel simultaneously available from one light source would be 100. Needless to say, all channels must satisfy the previously mentioned laser oscillation condition in order to realize such an efficient multichannel light source. For example, when the wavelength of the light selectively filtered by a multichannel filter is $\lambda i$ (i=1,2,3), the following equation 1 should be satisfied in logarithmic scale:

$$Gs(\lambda i)=Lc(\lambda i) \tag{1},$$

where Gs and Lc represent saturated gain and cavity loss, respectively.

Generally, the cavity loss, Lc has little dependence on wavelength, which means Lc is almost a constant function of wavelength. The saturated gain, Gs, however, has an inherent spectral profile depending on both pump power and input signal power owing to saturation characteristics of a gain medium. Consequently, in an ordinary condition, the equation 1 cannot be satisfied at all wavelengths. In case of a homogeneously broadened gain medium such as EDF, if the equation 1 is first satisfied at the wavelength of peak gain and laser oscillation takes place at this wavelength, the gain profile remains unchanged even though the pump power increases, which results in single channel oscillation, and the equation 1 cannot be satisfied at the other wavelengths.

Therefore, to find out a way to make optical fiber lasers oscillate in multiple channels and to increase the number of useful channels is becoming important technology in the field of WDM optical communication.

There have been 4 major methods invented to obtain multichannel laser oscillation from optical fiber lasers.

The first method is, as shown in FIG. 1, to cool EDF down to extremely low temperature by using a cooling device such as liquid nitrogen in order to reduce the homogeneous linewidth down to 0.5 nm or less. When EDF has the homogeneous linewidth of less than 0.5 nm, the two lights whose wavelengths are separated by 0.5 nm or more can obtain independent gains from EDF, which results in simultaneous laser oscillation at the two wavelengths. A birefringence filter consisting of a polarization maintaining fiber (PMF) 5, a polarizer 3 and a polarization controller (PC) 3 was used as a multichannel filter. The laser was made to oscillate unidirectionally using an optical isolator 6. The laser output is obtained via a 10% coupler. This method has played an important role in analyzing the characteristics of EDFL s. However, this method has limited applicability since it uses a cooling device such as liquid nitrogen that is hard to maintain.

FIG. 2 shows a schematic of the second method of realizing multichannel fiber lasers. It uses a 1×N coupling device for branching a light into a plurality of optical paths, such as a multi-branch optical fiber coupler and an AWG (Arrayed Waveguide Grating) filter, and a N×1 coupling device for multiplexing the branched light. Each optical path between 1×N and N×1 coupler contains a piece of EDF and an optical tunable filter (TF) having different transmission wavelength so as to selectively pass and amplify the light of a specific wavelength defined by the filter. With this configuration, each light of the corresponding optical path is able to obtain independent optical gain, so that the laser as a whole may operate in multiple channels defined by TF s. This method allows the multichannel fiber laser to operate at room temperature and the wavelength stability and the output power of each channel can be controlled by the corresponding TF and variable optical attenuator (ATN), respectively, channel by channel. However, this method eventually makes the laser system complicated when the demand of channel number increases, because the addition of channel requires additional set of EDF, an optical tunable filter, and a variable optical attenuator.

The third method is, as shown in FIG. 3, to connect a number of single channel fiber lasers, 8A–8B, with different wavelengths serially. FIG. 3 shows a serially connected fiber laser only, but it is possible to connect fiber lasers parallel. An optical fiber DBR(Distributed Bragg Reflector) laser and an optical fiber DFB(Distributed Feed Back) laser may be used as the individual fiber laser. Both types of fiber lasers use FBG(Fiber Bragg Grating) technology. This method also allows the laser system to operate in room temperature, and has the advantage of simplicity in both concept and configuration. However, it requires an equipment for fabricating the FBG to make multichannel fiber lasers with specific channel spacing and channel number, so this method requires large initial investment.

The final method, as shown in FIG. 4, has a configuration similar to that of the first method, but it has a frequency shifter instead of the cooling device for EDF. The conception of this method originates from a spectrum sliced light source (SSLS) that is a multichannel filtered ASE(Amplified Spontaneous Emission) light generated by an EDFA. This method was attempted to amplify the SSLS several times via an optical fiber ring resonator with a gain medium in order to achieve high output power. In FIG. 4, the frequency shifter was inserted to prevent the fiber laser from oscillating in a single wavelength and thus to make it advantageous to multichannel oscillation. Since the fiber laser using this method is able to operate in stable multiple channels even when all the channels share the same gain media, EDFA1 and EDFA2, at room temperature, it has advantages in both configuration and efficiency.

Prior techniques related to increment of the number of channel in the described multichannel fiber lasers are disclosed hereafter.

In the multichannel fiber laser of the first method, cooling the EDF is itself the method of increasing the number of oscillation channel. Suppression of internal reflections of a laser cavity to eliminate undesired filtering effect and the use of polarization hole burning effect of EDF have been demonstrated. However, these are merely the methods to remove the elements disturbing multichannel laser oscillation at laboratory level. The method for obtaining the desired number of multichannel oscillation in the desired wavelength range in the viewpoint of laser system design has not been developed.

In the second method, the number of channel is determined by the number of optical paths of the used multi-branch optical fiber coupler or multiplexer. Therefore, the appropriate devices have to be carefully chosen according to initial laser system design. Once the devices are chosen, there is no option to change the number of channel and the wavelength range.

In the third method, additional connection of new fiber lasers of different wavelength is to increase the number of channel.

Finally, in the fourth method, there has been no special technique about channel number increment developed.

SUMMARY OF THE INVENTION

The objects of the present invention are to provide a way to increase the number of lasing channel by enlarging the oscillation wavelength region in multichannel fiber lasers, and at the same time, to provide a useful multichannel laser source with equalized output power for all channels.

The present invention provides a multichannel fiber laser in which all the laser channels share one or more gain offering means comprising: a gain offering means for providing optical gain; a gain equalizing means for enlarging laser oscillation wavelength range, increasing the number of laser channels, and equalizing the optical gain from the gain offering means and output powers of all laser channels; and a resonating means including the gain equalizing means for selecting light channels, adjusting loss, controlling state of polarization, and outputting light to outside of the fiber laser.

Also, the present invention provides a method for designing a filter for equalizing a gain in a multichannel fiber laser having a resonator, a gain medium and a filter for equalizing gain profile. The method comprises the steps of: a first step of measuring loss of a light having passed the resonator as a function of the wavelength of the light source; a second step of measuring a small signal gain per unit length having passed the gain medium as a function of the wavelength of the light source; and a third step of determining a length of the gain medium so that the small signal gain may be the same as or larger than the resonator loss at all wavelengths within range of interest at a threshold pump power.

BRIEF DESCRIPTION OF THE DRAWING

The object, features and advantages of the present invention are understood within the context of the description of the preferred embodiment as set forth below. The description of the preferred embodiment is understood within the context of accompanying drawing, which forms a medium part of this disclosure, wherein.

DESCRIPTION OF THE PREFERRED EMBODIMENT

The gain equalizing filter of the present invention is a kind of band rejection filter for equalizing a gain of each WDM channel in an EDFA. The filter may consist of fiber Bragg grating filters having a short period or a long period, a combination of acousto-optic tunable filters, a combination of unbalanced Mach-Zehnder interferometers. Design parameters of EDFA, such as length of EDF and launched pump power, are determined by the input signal power and the required output signal power. Once the parameters of EDFA are determined, the gain profile of EDFA is uniquely determined. Then, the gain equalizing filter is designed to equalize the gain profile so as to provide a desired flat gain bandwidth. After the gain equalizing filter is installed in EDFA, the equalized gain profile is maintained unless the input signal power and the pump power are changed.

Such a gain equalizing filter can be applied to a multichannel fiber laser in order to increase the number of lasing channel and equalizes laser output power of all channels. However, the method of designing a gain equalizing filter in a multichannel fiber laser for this purpose is different from that used in EDFA.

The description of the preferred embodiment is as set forth below.

Figure 1:
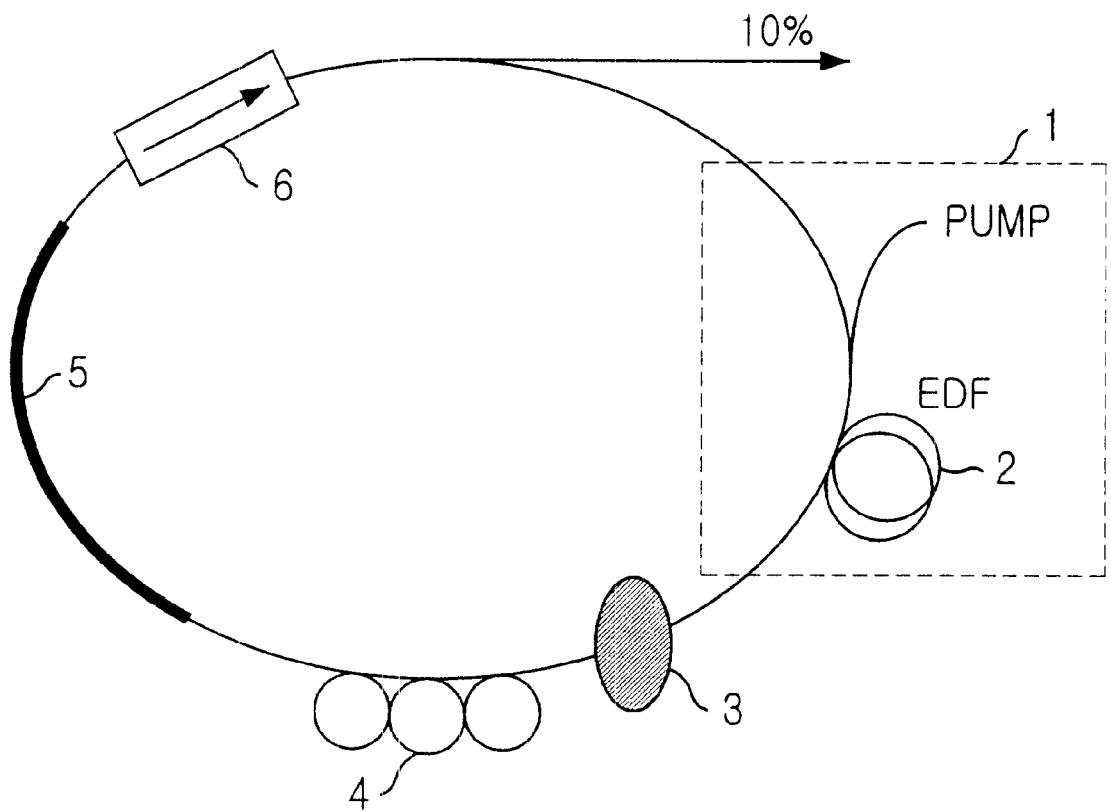
FIG. 1 is a configuration diagram of a prior multichannel fiber laser in which gain medium is cooled.
Figure 2:
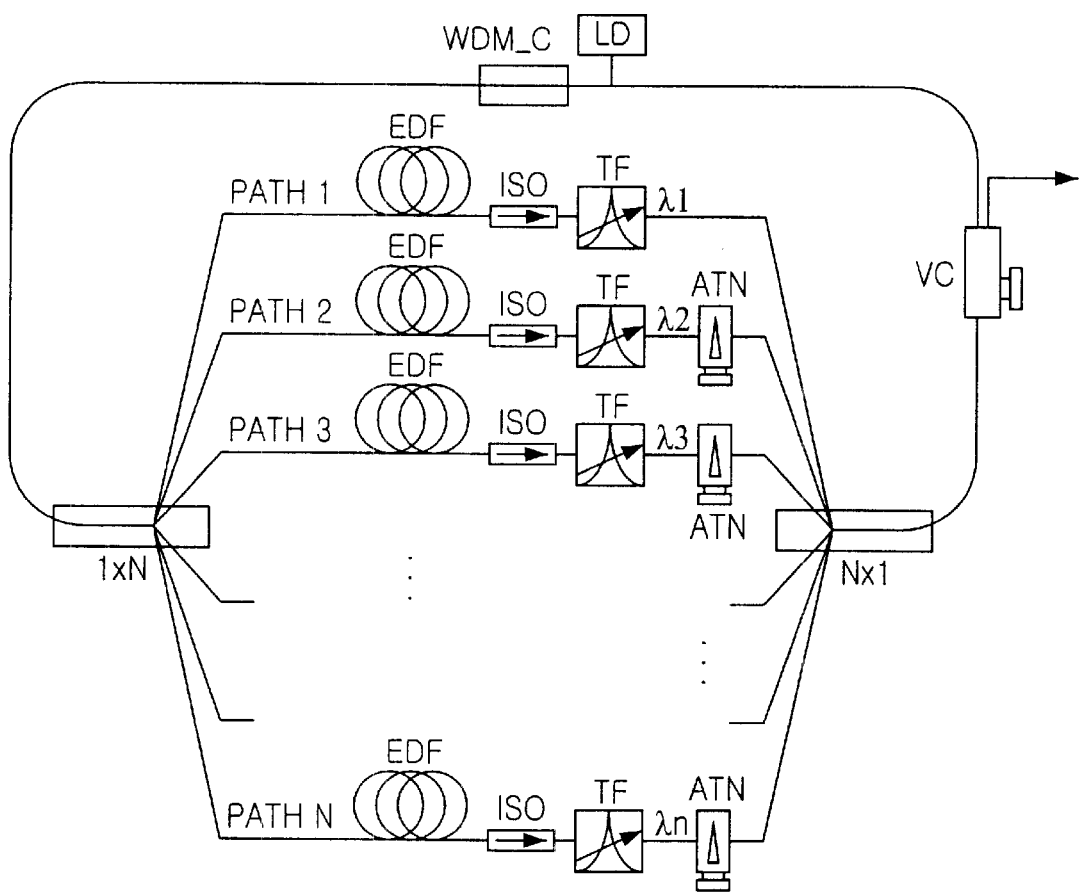
FIG. 2 is a configuration diagram of a prior multichannel fiber laser, using a 1×N and a N×1 optical fiber coupler.
Figure 3:
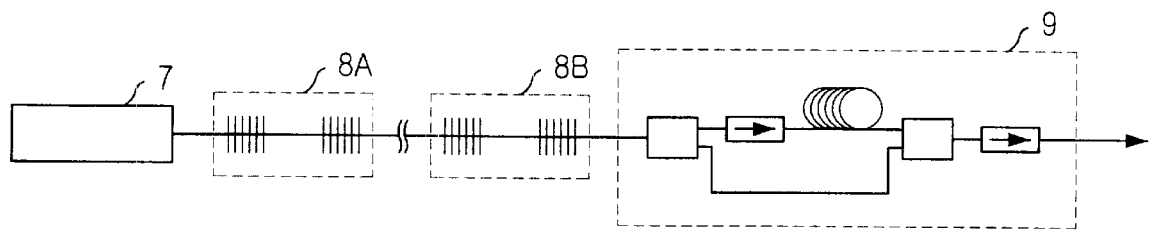
FIG. 3 is a configuration diagram of a prior multichannel fiber laser in which optical fiber DBR lasers are serially connected.
Figure 4:
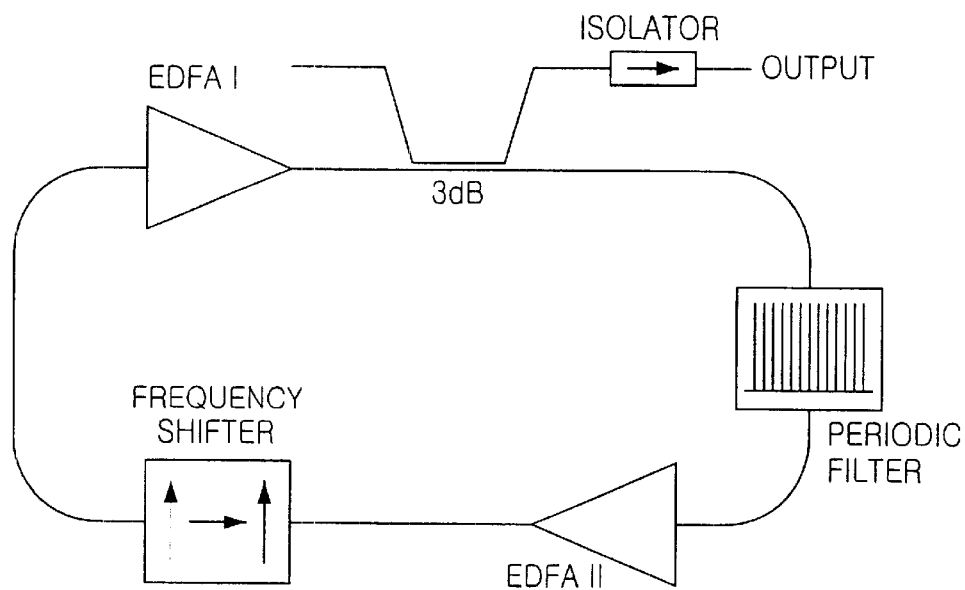
FIG. 4 is a configuration diagram of a prior multichannel fiber laser using a frequency shifter.
Figure 5:
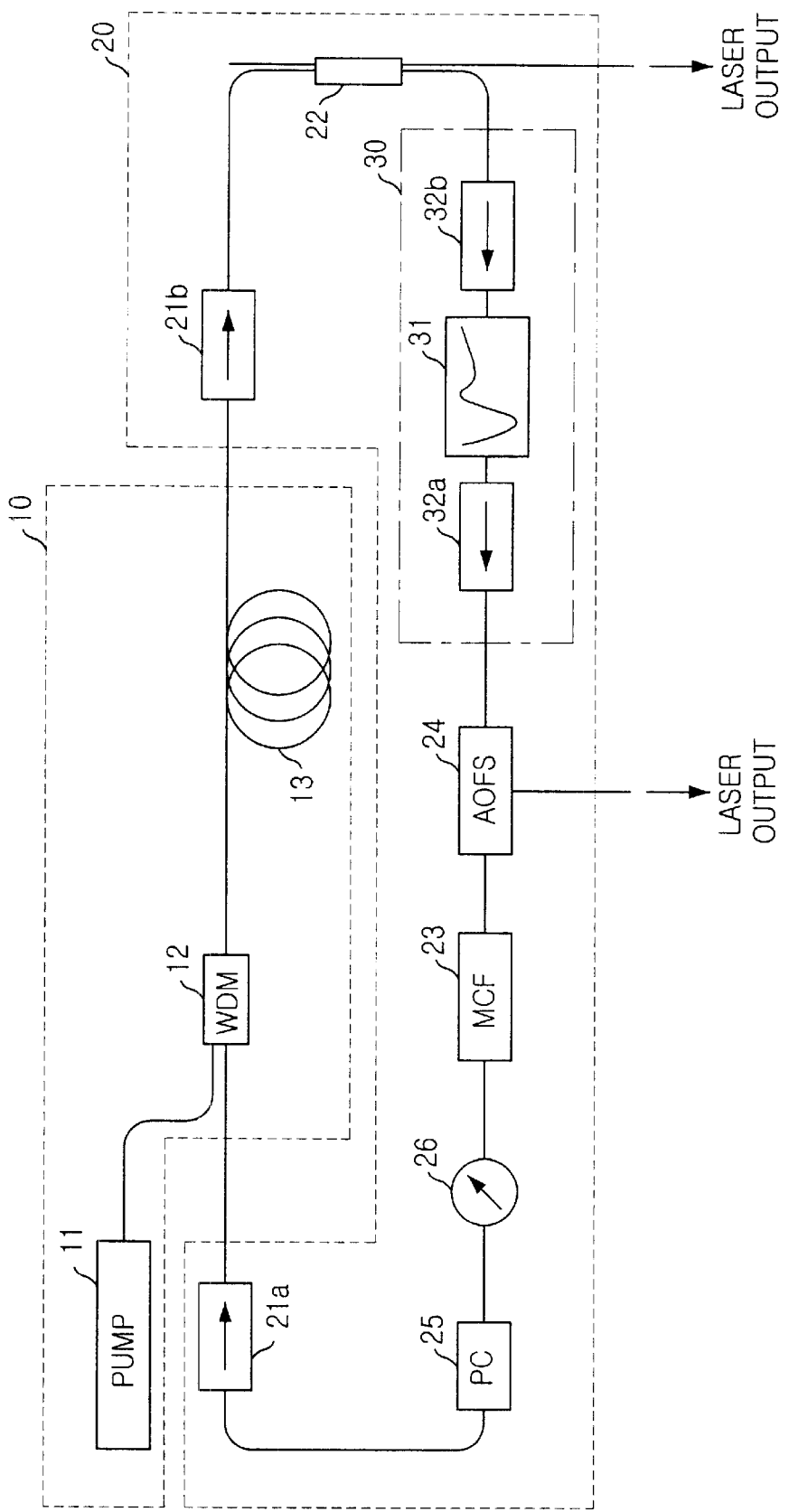
FIG. 5 is a configuration diagram of a multichannel fiber laser using a gain equalizing filter according to the present invention.

FIG. 5 is a configuration diagram of a multichannel fiber laser according to the present invention. The multichannel fiber laser comprises a gain offering means 10 for offering a gain, a resonating means 20 for selecting wavelengths, determining an operation direction, adjusting a loss of the resonator, controlling the state of polarization, and extracting the laser output from the resonator, and a gain equalizing means 30 included in the resonating means 20.

The gain offering means 10 comprises a pumping light source (PUMP) 11, a WDM directional coupler 12, and a gain medium 13. When an EDF is used as the gain medium 13, a laser diode having the wavelength of 980 nm or 1480 nm can be used as the pumping light source 11.

The gain equalizing means 30 is made of various optical devices, for example, a fiber Bragg grating filter of a long period or a short period, a combination of acousto-optic tunable filters, a combination of unbalanced Mach-Zehnder interferometers, and so on. If the gain equalizing means 30 is made of a fiber Bragg grating filter of a short period, it further comprises optical isolators 32a and 32b at the input/output of the filter 31 to eliminate back-reflection induced effect.

Either an EDF cooling device or a frequency shifter may be included in either the gain offering means 10 or a resonating means 20, respectively. An embodiment of the present invention employs the frequency shifter 24 in the resonating means 20.

The resonating means 20 comprises optical isolators 21a and 21b, an output coupler 22, a multichannel filter (MCF) 23, an acousto-optic frequency shifter (AOFS) 24, a polarization controller (PC) 25 and a variable attenuator 26. The optical isolators 21a and 21b enables unidirectional laser oscillation and prevents the backreflected light from affecting the gain medium 13. The number of isolators can be reduced when the components with lower backreflection are used. The output coupler 22 outputs a part of laser light to outside of the resonating means 20. The frequency shifter 24 is a device to shift the optical frequency of a part of the incident light by constant amount from a few MHz to a few GHz and transmit the frequency shifted light to an output port, while the light without frequency shift is outputted to outside via a remaining port. The multichannel filter 23 may be a Fabry-Perot etalon, a Fabry-Perot tunable filter, a birefringence filter, and various kinds of optical filters with multichannel pass bands. The polarization controller 25 controls the state of polarization to maximize the laser output power outputted from the output coupler 22 and the frequency shifter 24. The variable attenuator 26 enables the cavity loss to be finely adjusted to an optimum value according to the design.

When the pumping light from the pumping light source 11 is launched into the gain medium 13, the light in the signal band is generated by spontaneous emission process. A portion of the light propagating through the fiber in one direction can only pass the optical isolator 21b, and it passes the output coupler 22, the gain equalizing means 30, the frequency shifter 24, the multichannel filter 23, the variable attenuator 26, the polarization controller 25, and the optical isolator 21a while experiencing loss, and then it goes back into the gain medium 13 via the WDM coupler 12. The light is then amplified by stimulated emission process in the gain medium 13. The amplified light passes the resonating means 20 again and is amplified in the gain medium 13, repeatedly. When the single pass gain in the gain medium finally becomes equal to the cavity loss, the light goes into the steady state and the laser oscillation takes place.

Figure 8A:
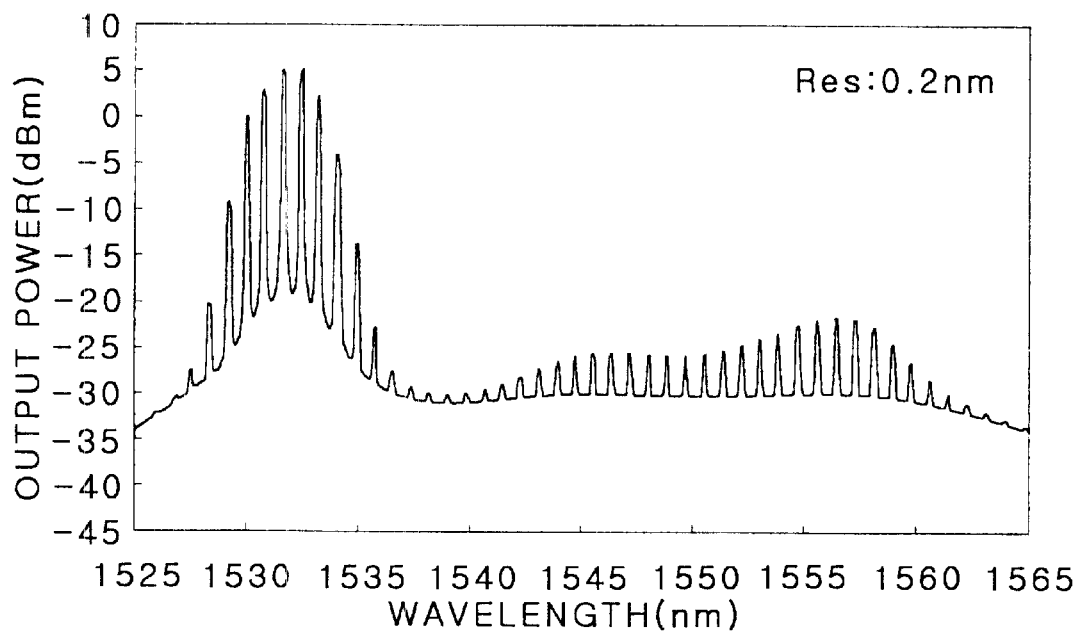
FIG. 8A is a graph showing an output spectrum of multichannel fiber laser without a gain equalizing filter.

If the gain equalizing means 30 is not inserted in the laser cavity, the oscillation channels of the laser mainly exist near the 1530 nm band having the highest gain at the threshold pump power, as shown in FIG. 8A. If the gain spectrum is flat at the threshold pump power, the laser oscillation may take place at all channels within the flat gain bandwidth and the corresponding laser output power can be equalized owing to the saturation characteristics of the gain medium.

However, since the flat range of a gain spectrum of EDF is limited, it is necessary to properly design the gain equalizing filter 31 in order to achieve the desired flat gain bandwidth to obtain the desired number of channel with equalized output power. To do this, the cavity loss and the small signal gain are to be exactly measured.

In order to measure the loss of the resonating means 20 except the gain equalizing means 30, a light source is launched into one end of the resonating means 20, and the output power $P_{out}$ of the transmitted light from the other end of the resonating means 20 is measured by an optical power meter. Then the resonating means 20 is replaced by a dummy single mode fiber and the input power $P_{in}$ of the launched light is measured. The loss of the resonating means 20 is calculated by the following equation 2 using the measured values:

$$A(\lambda) = -10 \log [P_{out}(\lambda)/P_{in}(\lambda)] \qquad (2)$$

If a tunable laser source with narrow linewidth is used as the light source, the loss can be measured as a function of wavelength. The linewidth of the tunable laser source must be narrower than the channel bandwidth of the multichannel filter.

To exactly measure the small signal gain of the gain offering means 10, the pumping light source 11 is launched into the gain medium 13 via the WDM coupler 12 to excite the gain medium 13. Then, the input signal of lower than 30 dB from a tunable laser source is launched into the gain offering means 10. The output signal power $P_{out}$ is then measured by an optical power meter or an optical spectrum analyzer at given pump powers. The length of the gain medium 13 is measured within the accuracy of ±5 cm for the reference value of the gain at the other length. In order to measure the actual gain with high accuracy, the length of the gain medium 13 is recommended to be longer than 10 m. After the gain medium 13 is replaced by a dummy single mode fiber, the input signal power $P_{in}$ is measured precisely.

In case of forward pumping, the gain spectrum at a certain pump power is proportional to forward ASE at the same pump power. Using this fact, once the gain at a certain pump power is calculated as a function of wavelength according to the following equation 3 and at the same time, the ASE spectrum is measured by an optical spectrum analyzer, the gain at the other pump power can be easily calculated by measuring the ASE spectrum only.

$$G(\lambda)=10 \log [(P_{out}(\lambda)-P_{ASE}(\lambda))/P_{in}(\lambda)] \quad (3)$$

Dividing the calculated gain by the length of the gain medium 13 results in the gain per unit length.

For example, when the loss of the resonating means 20 is 25 dB, the length of the gain medium 13 can be determined from the measured gain per unit length data for various pump powers so that the gain medium 13 in a desired wavelength band may provide a gain larger than 25 dB. In fact, the concept of average inversion is used in determining the length of the gain medium. When the average inversion values are the same, the gain profiles are the same regardless of the length of the gain medium although the absolute gain values are proportional to the length.

Figure 6A:
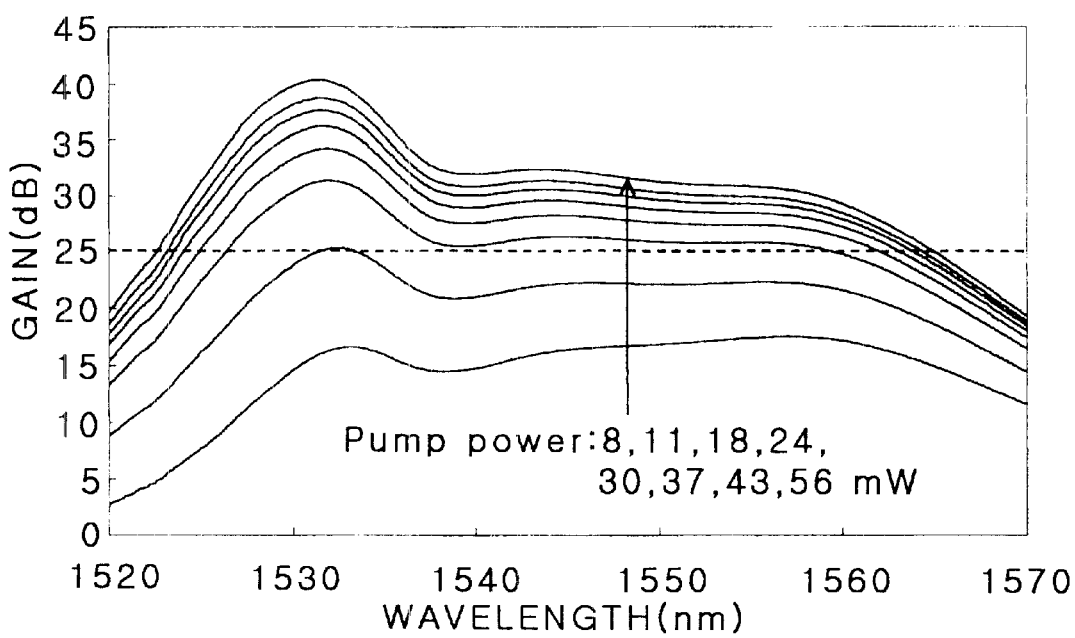
FIG. 6A is a graph showing a gain spectrum according to various launched power of a pumping light source.

Since the gain equalizing filter 31 is a passive device, it is important to design the filter so that the minimum small signal gain in wavelength domain may be larger than the background loss of the gain equalizing filter 31 that can be manufactured practically. When the EDF (model: HE980) manufactured by Lucent Technology cooperation was used as the gain medium 13, an optimum result could be obtained at the EDF length of 27 m for the resonating means 20 having the loss of 25 dB. The resultant gain spectra corresponding to various pump powers are as shown in FIG. 6A. The dotted line in the figure shows the loss level of the laser cavity. When the incident pump power from a 980 nm laser diode became larger than 18 mW, the small signal gain became larger than the loss of the resonating means 20 in the range of 1530–1560 nm.

Figure 7A:
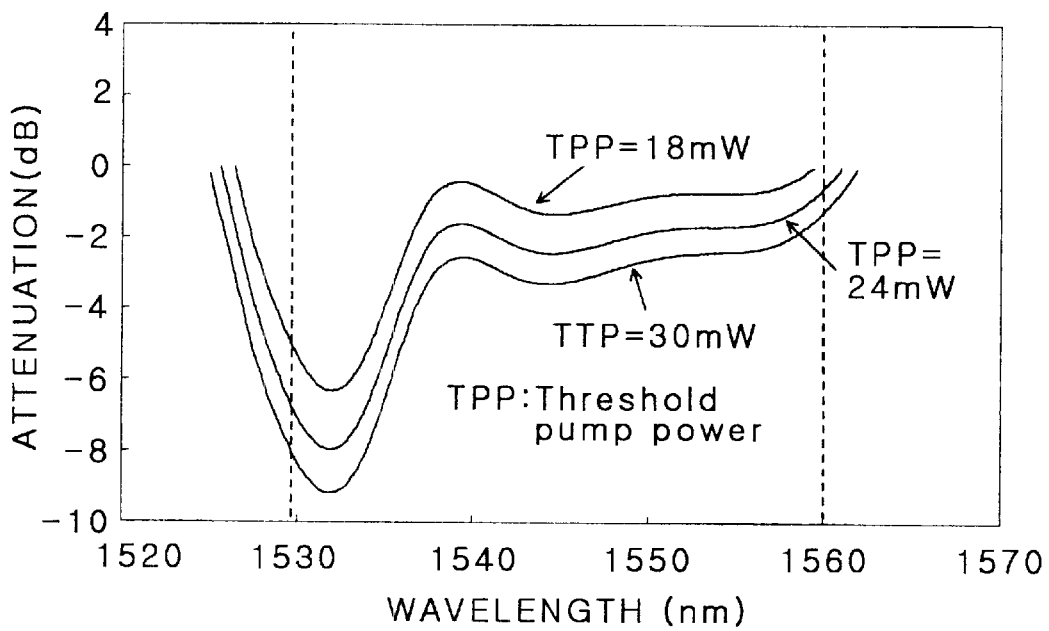
FIG. 7A is a graph showing a transmittance spectrum of gain equalizing filters to give three different threshold pump powers.

FIG. 7A shows typical transmission characteristics of the gain equalizing filters that equalize the small signal gain at the loss level of the resonating means in the range of 1530 nm–1560 nm at the incident pump power of 18 mW, 24 mW, and 30 mW, respectively. Each pump power corresponds to the threshold pump power of laser oscillation when the corresponding gain equalizing filter is used. The error between the measured loss and gain value can be compensated by fine adjustment of the cavity loss using the variable attenuator 26 or by controlling the conversion efficiency of the frequency shifter 24.

Figure 6B:
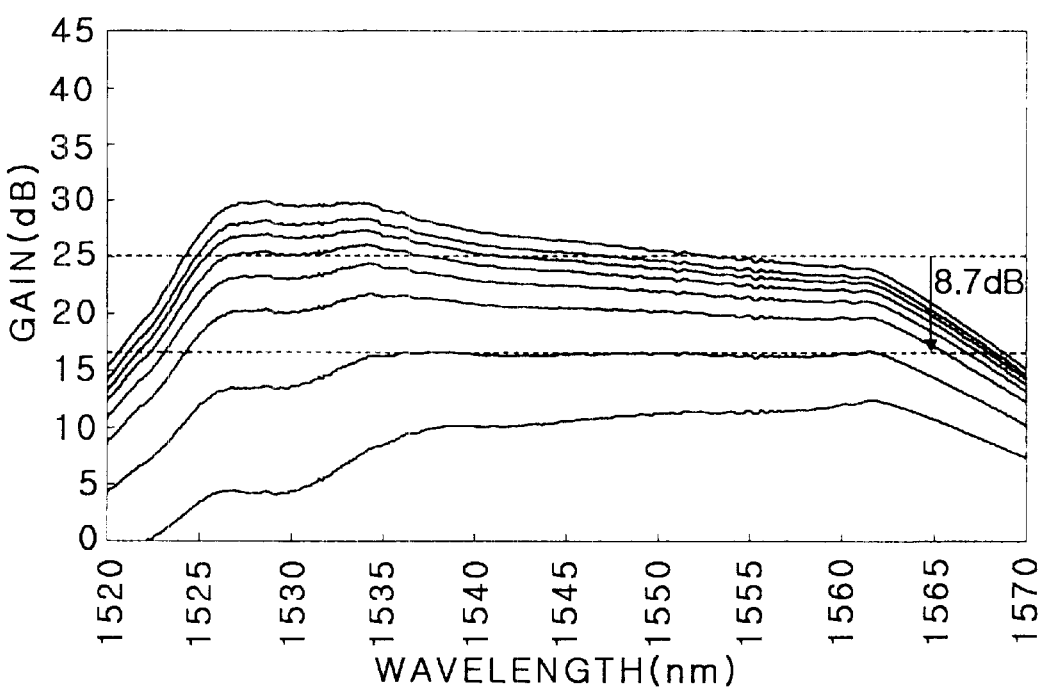
FIG. 6B is a graph showing a gain spectrum according to various launched power of a pumping light source after having passed a gain equalizing filter.
Figure 7B:
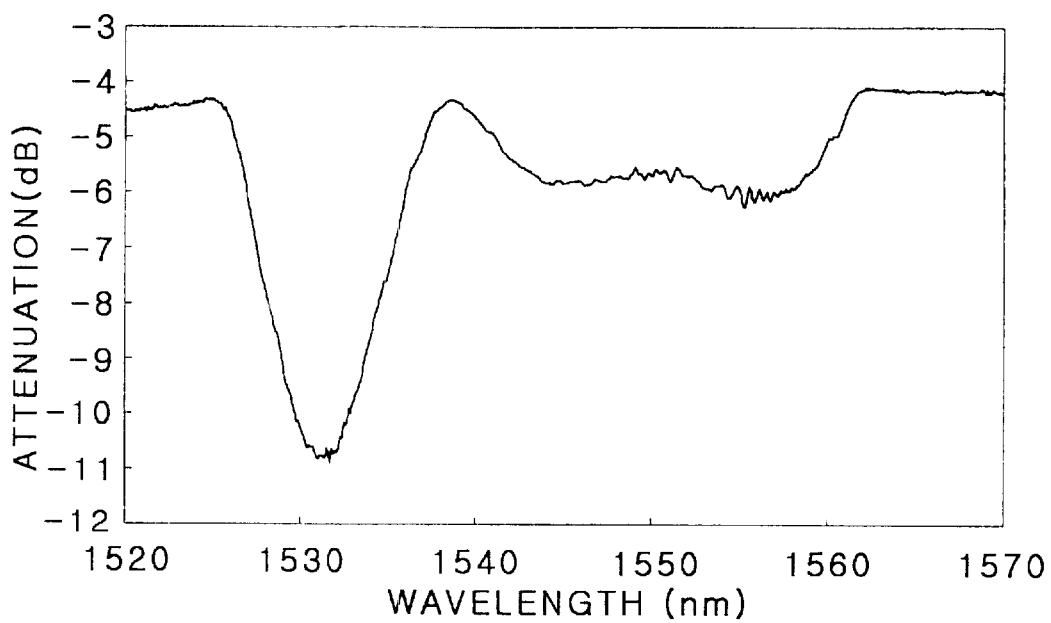
FIG. 7B is a graph showing a transmittance spectrum of a gain equalizing filter according to the present invention.

A gain equalizing filter having a transmittance spectrum as shown in FIG. 7B was used as an example. FIG. 6B is a graph showing the gain spectrum of FIG. 6A after having passed the gain equalizing filter. When the incident pump power was 11 mW, an equalized gain with gain flatness of less than 0.5 dB could be obtained in the range of 1535–1562 nm. In order to obtain laser oscillation at this condition, the loss of the resonating means 20 must have been reduced by ~8.7 dB. When the loss of the resonating means 20 was reduced to a level of ~16.3 dB, the laser oscillation took place in all spectral range where the gain was equal to the cavity loss. The number of channel of the multichannel filter belonging to the range determined the number of laser channel, that was 34 at this example.

Figure 8B:
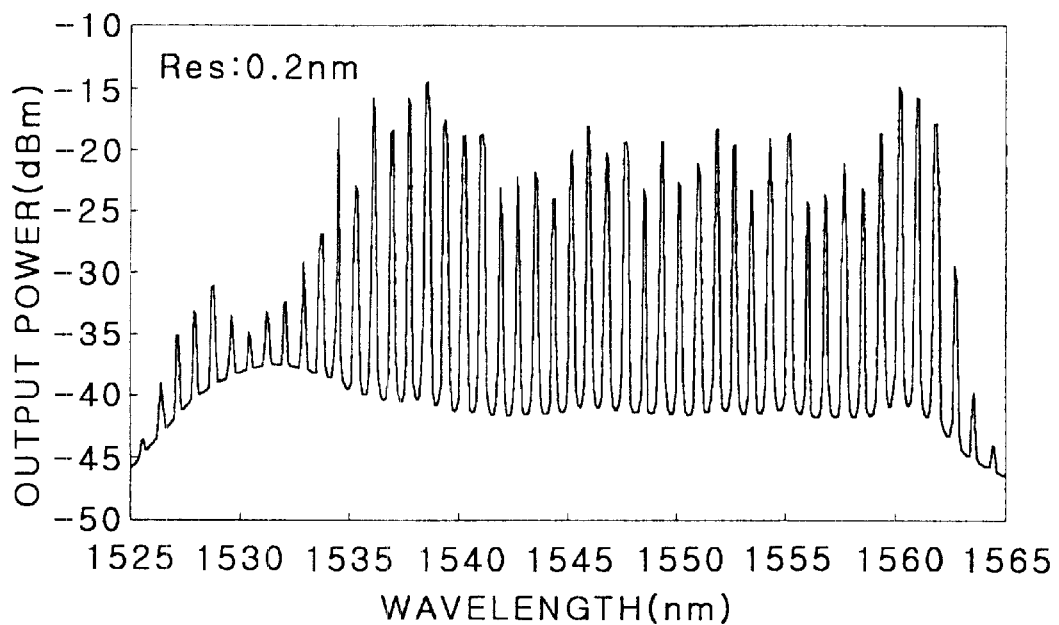
FIG. 8B is a graph showing an output spectrum of multichannel fiber laser with a gain equalizing filter.

FIG. 89 is a graph showing output spectrum of the laser in which the incident pump power was 4.5 times larger than the threshold pump power. When the spectrum is compared with that from the laser without a gain equalizing filter as shown in FIG. 8A, the number of laser channels having output powers within 10 dB of their maximum value increases from 6 to 34. Ups and downs of the laser output power by channels in the FIG. 8B resulted from the ripples of the transmittance spectrum of the manufactured gain equalizing filter as shown in FIG. 7B. Improved performance with better equalized output power by channels is expected when a high quality gain equalizing filter with less ripples is used.

When a gain shifted erbium-doped fiber amplifier with gain at a long wavelength range of 1570–1600 nm is used, in which the gain profile has inherent flatness of less than 1.0 dB, a multichannel fiber laser in the same long wavelength band can be obtained according to the same method described in the present invention without gain equalizing filter.

According to the present invention, we can enlarge the laser oscillation range, increase the number of laser channel, and equalize the laser output power channel by channel. This method can apply to a general multichannel laser system where a multichannel filter is used and all the channels share one or more gain media.

Although a preferred embodiment of the present invention has been illustrated and described, various alternatives, modifications and equivalents may be used. Therefore, the foregoing description should not be taken as limiting the scope of the present invention, which is defined by the appended claims.

What is claimed is:

1. A multichannel fiber laser in which all the laser channels share one or more gain offering means comprising:
   a gain offering means for providing optical gain;
   a gain equalizing means for enlarging laser oscillation wavelength range, increasing the number of laser channels, and equalizing the optical gain from the gain offering means and output powers of all laser channels; and
   a resonating means including the gain equalizing means for selecting light channels, adjusting loss, controlling state of polarization, and outputting light to outside of the fiber laser.

2. A laser in accordance with claim 1, the gain offering means comprises:
   a pumping light source;
   a wavelength division multiplexing coupler for coupling output of the pumping light source into the resonating means; and
   a gain medium connected at rear of the wavelength division multiplexing coupler for amplifying oscillating light in the resonating means and offering a gain.

3. A laser in accordance with claim 2, the gain medium is an erbium-doped fiber.

4. A laser in accordance with claim 1, the gain offering means has a gain medium of such a length that small signal gain offered by the gain offering means may be the same as or larger than loss of the resonating means at all wavelengths within a range of interest at a given pump power as well as the small signal gain profile per unit length may be flattened by the gain equalizing means.

5. A laser in accordance with claim 1, the gain equalizing means comprises a gain equalizing filter.

6. A laser in accordance with claim 1, the gain equalizing means uses population inversion of the gain offering means in order to obtain a flat gain spectrum within the range of interest at the threshold pump power.

7. A laser in accordance with claim 5, the gain equalizing filter comprises either long period fiber Bragg gratings or short period fiber Bragg gratings.

8. A laser in accordance with claim 5, the gain equalizing filter comprises acousto-optic tunable filters.

9. A laser in accordance with claim 7, the gain equalizing filter comprising the short period fiber Bragg gratings further comprises optical isolators at the input/output of the gratings to eliminate back-reflection induced effect.

10. A laser in accordance with claim 5, the gain equalizing filter comprises unbalanced Mach-Zehnder interferometers.

11. A laser in accordance with claim 1, the resonating means comprises:
- a first and second optical isolators respectively located at the front and rear of the gain offering means for suppressing back-reflection induced effect as well as enabling unidirectional operation;
- an output coupler located between the rear of the first optical isolator and the gain equalizing means for outputting laser light to outside of the resonating means;
- a frequency shifter located at the rear of the gain equalizing means for suppressing single wavelength oscillation;
- a multichannel filter located at the rear of the frequency shifter for selectively filtering the wavelengths of light;
- a variable attenuator located at the rear of the multichannel filter for adjusting the loss of the resonating means; and
- a polarization controller located at the rear of the variable attenuator for controlling the state of polarization.

12. A laser in accordance with claim 11, the multichannel filter is a Fabry-Perot etalon.

13. A laser in accordance with claim 11, the multichannel filter is a Fabry-Perot tunable filter.

14. A laser in accordance with claim 11, the multichannel filter is a birefringence filter.

15. A laser in accordance with claim 11, the frequency shifter is either a bulk optic acousto-optic frequency shifter or a fiber-optic acousto-optic frequency shifter.

16. A laser in accordance with claim 1, the pumping light source is a laser diode having a wavelength of 980 nm or 1480 nm.

* * * * *